(12) United States Patent
Bommer

(10) Patent No.: US 10,844,189 B2
(45) Date of Patent: Nov. 24, 2020

(54) FUNCTIONAL MATERIAL HAVING AT LEAST ONE ADDITIVE

(71) Applicant: Puren GmbH, Ueberlingen (DE)

(72) Inventor: Hans Bommer, Ueberlingen (DE)

(73) Assignee: Puren GmbH, Ueberlingen (DE)

( * ) Notice: Subject to any disclaimer, the term of this patent is extended or adjusted under 35 U.S.C. 154(b) by 201 days.

(21) Appl. No.: 15/772,943

(22) PCT Filed: Nov. 4, 2016

(86) PCT No.: PCT/EP2016/076720
§ 371 (c)(1),
(2) Date: Jun. 8, 2018

(87) PCT Pub. No.: WO2017/077069
PCT Pub. Date: May 11, 2017

(65) Prior Publication Data
US 2018/0312656 A1    Nov. 1, 2018

(30) Foreign Application Priority Data

Nov. 5, 2015 (DE) .......................... 10 2015 118 958

(51) Int. Cl.
| | | |
|---|---|---|
| *B29C 67/20* | (2006.01) | |
| *C08J 9/00* | (2006.01) | |
| *C08J 9/33* | (2006.01) | |
| *C08J 9/35* | (2006.01) | |
| *E04B 1/80* | (2006.01) | |
| *E04B 1/94* | (2006.01) | |
| *B29K 75/00* | (2006.01) | |
| *B29K 105/12* | (2006.01) | |
| *B29K 105/00* | (2006.01) | |

(52) U.S. Cl.
CPC .............. *C08J 9/35* (2013.01); *B29C 67/207* (2013.01); *C08J 9/0066* (2013.01); *C08J 9/0085* (2013.01); *C08J 9/0095* (2013.01); *C08J 9/33* (2013.01); *E04B 1/80* (2013.01); *E04B 1/942* (2013.01); *E04B 1/947* (2013.01); *B29K 2075/00* (2013.01); *B29K 2105/0026* (2013.01); *B29K 2105/12* (2013.01); *B29K 2105/251* (2013.01); *B29K 2995/0015* (2013.01); *B29K 2995/0016* (2013.01); *B29K 2995/0063* (2013.01); *B29K 2995/0082* (2013.01); *C08J 2205/10* (2013.01); *C08J 2300/24* (2013.01); *C08J 2300/30* (2013.01); *C08J 2361/04* (2013.01); *C08J 2375/04* (2013.01); *C08J 2400/24* (2013.01); *C08J 2400/30* (2013.01); *C08J 2461/04* (2013.01); *C08J 2475/04* (2013.01)

(58) Field of Classification Search
CPC . C08J 9/35; C08J 9/0066; C08J 9/0085; C08J 9/33; C08J 9/0095; C08J 2300/24; C08J 2475/04; C08J 2205/10; C08J 2461/04; C08J 2400/30; C08J 2300/30; C08J 2400/24; C08J 2375/04; C08J 2361/04; B29C 67/207; B29K 2995/0015; B29K 2075/00; B29K 2105/12; B29K 2105/0026; B29K 2995/0082; B29K 2995/0063; B29K 2995/0016; B29K 2105/251; E04B 1/80; E04B 1/942; E04B 1/947
See application file for complete search history.

(56) References Cited

U.S. PATENT DOCUMENTS

| | | |
|---|---|---|
| 9,193,912 B2 | 11/2015 | Angenendt et al. |
| 2004/0000736 A1 | 1/2004 | Rasshofer |
| 2013/0197113 A1* | 8/2013 | Stahl .................. C08K 3/04 521/103 |

FOREIGN PATENT DOCUMENTS

| | | |
|---|---|---|
| AT | 506575 B1 | 10/2009 |
| DE | 198 43 595 A1 | 4/2000 |
| DE | 102 28 473 A1 | 2/2004 |
| DE | 103 30 555 A1 | 2/2005 |
| DE | 10 2010 044 466 A1 | 3/2012 |
| DE | 10 2011 056 368 A1 | 6/2013 |
| EP | 0 989 160 A1 | 3/2000 |
| EP | 1 375 104 A1 | 6/2003 |
| EP | 1 641 895 B1 | 6/2009 |
| EP | 2 208 594 B1 | 5/2014 |
| WO | 2012/048860 A1 | 4/2012 |
| WO | 2012/091557 A1 | 7/2012 |

OTHER PUBLICATIONS

Office Action dated Apr. 25, 2019 issued in corresponding EP patent application No. 16 794 973.4 (and English translation).
German Search Report dated Aug. 26, 2016 issued in corresponding DE patent application No. 10 2015 118 958.5 (and partial translation thereof).
International Search Report ("ISR") dated Jan. 12, 2017 issued in corresponding international patent application No. PCT/EP2016/076720.
International Preliminary Report on Patentability (Chapter II) dated May 11, 2018 issued in corresponding international patent application No. PCT/EP2016/076720.
Third Party Observation dated May 22, 2019 issued in corresponding EP patent application No. 16 794 973.4 (and English translation).

(Continued)

*Primary Examiner* — Patrick D Niland
(74) *Attorney, Agent, or Firm* — Posz Law Group, PLC

(57) ABSTRACT

A functional material has, as a first component, a thermoset plastic material, as a second component, a binding material for binding the thermoset plastic material, and, as a third component, at least one additive, which is configured to improve a burning behavior, wherein the burning behavior corresponds at least to a fire reaction class C as given by DIN EN 113501-1 [German/European norm 113501-1]. A method is intended for producing such a functional material and an element is produced from such a functional material.

17 Claims, 1 Drawing Sheet

(56) References Cited

OTHER PUBLICATIONS

BOSIG Holding GmbH & Co. KG brochure. Oct. 2009.
Technical Information Phonotherm 200. BOSIG. 2008. (and English translation).
Technical Information Phonotherm 200. BOSIG. 2011. (and English translation).
Technical Information Phonotherm 200. BOSIG. 2001. (and English translation).
George Luh. Info Sheet. 2010 (and English machine translation).
LANXESS AG. "Know-how PUR". UTECH Europe 2012. (and English translation).
Office Action dated Aug. 18, 2020 issued in corresponding CN patent application No. 201680077517.8 (and English summary).

\* cited by examiner

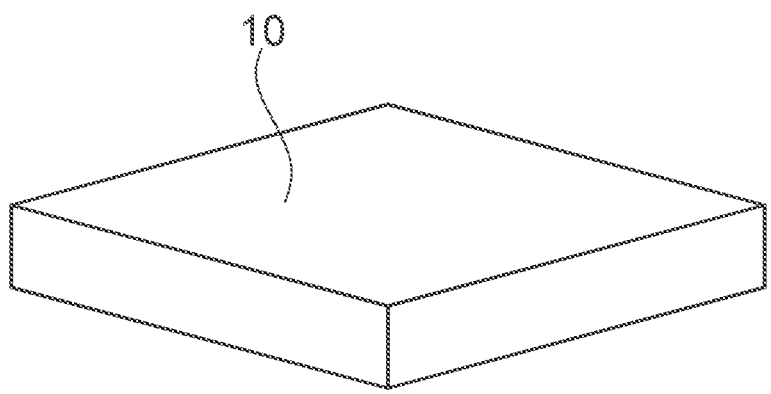

FUNCTIONAL MATERIAL HAVING AT LEAST ONE ADDITIVE

CROSS REFERENCE TO RELATED APPLICATIONS

This application is a U.S. national stage application of PCT/EP2016/076720 filed on Nov. 4, 2016, which is based on German Patent Application No. 10 2015 118 958.5 filed on Nov. 5, 2015, the contents of which are incorporated herein by reference.

STATE OF THE ART

The invention concerns a functional material, a method for producing the functional material and elements produced from the functional material.

By the denomination "purenit" a functional material is already known whose components are constituted by a comminuted rigid-foam based thermoset plastic material and a binding material for binding the thermoset plastic material.

The objective of the invention is in particular to be capable of providing elements which have a wide range of applicability. The objective is achieved according to the invention by the features of the independent claims while advantageous implementations and further developments of the invention may be gathered from the dependent claims.

Advantages of the Invention

The invention is based on a functional material having, as a first component, a thermoset plastic material and, as a second component, a binding material for binding the thermoset plastic material.

It is proposed that the functional material comprises at least one additive which is, as a third component, configured to improve a burning behavior. In this way it is achievable that the functional material fulfills increased requirements in particular regarding preventive fire protection, as a result of which elements made of the functional material may be used in an even wider range of applications. By an "additive" is herein in particular a material to be understood which has been added to the thermoset plastic material, to the binding material or to a mixture of the thermoset plastic material and the binding material. It is in particular not to be understood as a coating applied to a surface of an element that is produced from the functional material. By a "thermoset plastic material" is in particular a material to be understood that is implemented of a synthetic material or of a mixture of synthetic materials, which is/are not further deformable after curing. A "component" is in particular to mean a constituent for a production of the functional material. Preferably the thermoset plastic material constitutes a larger component, which means a component that is larger than the remaining components. "To improve a burning behavior" is in particular to mean that the additive improves a behavior of the functional material in case of a flame and/or heat impact without substantially impairing other characteristics of the functional material. Other characteristics are in particular mechanical characteristics, e.g. compressive strength, flexural strength, screw holding strengths and/or application-relevant characteristics like in particular a thermal conductivity or a diffusion behavior. "Substantially impairing" is in particular to mean that the values of the other characteristics are reduced by maximally 20%, advantageously by maximally 10%, towards a less desirable value.

In this context, an "additive" is in particular to be understood as a material which at least substantially influences only the burning behavior. "Configured" is in particular to mean specifically designed and/or equipped.

Preferentially the thermoset plastic material comprises comminuted PUR rigid foam and/or PIR rigid foam and/or comminuted phenolic rigid foam, bound by the binding material. In this way a functional material may be rendered available which has a favorable burning behavior. A "comminuted PUR rigid foam and/or PIR rigid foam" is herein in particular to mean a mechanically comminuted hard rigid foam, which is based on polyurethane (PUR), in particular according to DIN EN 13165 [German/European norm 13165], or on polyisocyanurate (PIR). By a "comminuted phenolic rigid foam" is herein in particular a mechanically comminuted phenolic rigid foam or a comminuted material based on a phenolic rigid foam to be understood. The thermoset plastic material may principally be a mixture of PUR, PIR, phenolic rigid foam, or further thermoset plastic materials, in particular hard foams implemented of thermoset plastic materials. In particular, the functional material is recyclable. Mechanically comminuting elements implemented of the functional material allows making use of them as a thermoset plastic material for producing the functional material. By "mechanically comminuted" is in particular to be understood that for the thermoset plastic material cured rigid foam is used, like for example manufacturing residue, processing residue or salvage elements, which cured hard foam is comminuted in a mechanical procedure, e.g. by grinding, shredding or chopping.

Furthermore it is proposed that the functional material comprises a fiber material, which is mixed with the thermoset plastic material and/or the binding material and/or the additive. By adding a fiber material a burning behavior is further improvable. By a "fiber material" is herein in particular a material to be understood which is implemented of mineral fibers or non-mineral fibers, e.g. glass fibers, carbon fibers, ceramic fibers or basalt fibers.

It is proposed that the functional material has a burning behavior corresponding at least to a fire reaction class C according to DIN EN 13501-1 [German/European norm 13501-1] and/or corresponding at least to a building material class B1 according to DIN 4102-1 [German norm 4102-1]. In accordance with this, the functional material is considered to be "difficult to ignite", due to which the elements made of the functional material are also considered to be "difficult to ignite". As the burning behavior of the functional material corresponds to the above classes, a functional material whose burning behavior, without the additive, only corresponds to a fire reaction class E and a building material class B2, i.e. which is considered to have "normal combustibility", may be used in applications requiring a material that is "difficult to ignite". It is therefore possible to utilize the elements made of the functional material in a particularly wide range. "At least" is in particular to mean, in this context, that the burning behavior is equivalent or better in terms of fire protection.

It is further proposed that the additive is mixed with the thermoset plastic material and/or the binding material, in particular before completion of a production of the functional material. This allows especially advantageously influencing the burning behavior. In particular, the burning behavior considered to be "difficult to ignite" may be achieved for the entire functional material, i.e. also for a core of an element that is produced from the functional material, and is not only due to surface characteristics of the elements. By "mixed" is herein in particular to be understood that the additive has been introduced into the functional material and has preferably been mixed with the thermoset plastic material and/or the binding material homogeneously or at least substantially homogeneously.

Preferably the additive has a mass fraction of at least 3%. As a result, the burning behavior is influenceable in a particularly positive manner. A "mass fraction" is herein in particular to mean a fraction of a total mass of the functional material, which in particular results from the mass fractions of the different components. A mass fraction given in percent is herein in particular to mean a fraction in weight percent.

It is proposed that, in case of a temperature impact, the additive presents an intumescent behavior. In this way the burning behavior is influenceable without a chemical and/or physical interaction taking place in the functional material. This allows the characteristics presented by the functional material when manufactured without the additive to be maintained almost unchanged, as well as making a functional material available which is usable over a wide range of applications and has a favorable burning behavior.

The additive preferentially features an expansion rate of at least 30 cm$^3$/g. In this way the burning behavior is improvable in a particularly desirable manner. By an "expansion rate" is herein in particular a volume to be understood by which the additive expands if heated to a temperature above an activation temperature, standardized for a mass. Preferably the expansion rate is at least 100 cm$^3$/g. Principally, for an expanding additive different materials are conceivable whose volume will increase if their temperature exceeds the activation temperature. Herein the activation temperature is preferably smaller than a temperature occurring during production of the functional material.

Moreover it is proposed that the additive has an activation temperature of at least 90° C. This allows, if only temperatures below the activation temperature occur in a production procedure, mixing the additive into the functional material already during production without involving changes of the production procedure. The activation temperature is preferably at least 140° C. In particular, the additive is chosen such that its activation temperature is greater than the temperature occurring during production of the functional material.

The additive preferably has a carbon content. As a result, in case of a flame impact, besides improving the burning behavior, carbonization is supported and an oxygen inflow is decelerated. It is simultaneously achievable that the characteristics of the functional material are not changed in an undesirable manner. The carbon content is preferentially at least 50%, preferably at least 70% and especially preferentially at least 80%, but may be even greater.

Preferentially the additive is halogen-free, wherein preferably at least 60% of the additive feature a particle size of at least 100 µm. This allows mixing the additive into the thermoset plastic material in a particularly favorable fashion prior to adding the binding material. Furthermore a high grade of mixabiltiy into the binding material is achievable.

In a particularly advantageous implementation the additive is structured on the basis of a graphite, in particular an expandable graphite. This allows creating an especially advantageous functional material.

Beyond this a method for producing a functional material from a thermoset plastic material, in particular a thermoset plastic material based on PUR rigid foam and/or PIR rigid foam, which is, in a comminuted state, mixed with at least one binding material, wherein at least one additive is added which improves a burning behavior prior to an impact of temperature and/or pressure onto the thermoset plastic material and the binding material. This allows providing a functional material from which it is possible to produce elements considered to be "difficult to ignite". "Comminuted" is in particular to mean, in this context, that the thermoset plastic material features a maximum particle size of 5 mm. Preferably the maximum particle size is smaller than 1 mm.

The additive is preferably added before and/or after and/or simultaneously with introducing the binding material. In particular, the additive may be mixed with the comminuted thermoset plastic material before the binding material is added. It is however also conceivable that the additive is mixed with the binding material and is thus added to the thermoset plastic material simultaneously with the binding material. It is further conceivable that first the thermoset plastic material and the binding material are mixed with one another and the additive is added afterwards. It is also conceivable that the additive is added in several steps.

It is furthermore proposed that the thermoset plastic material comprises comminuted functional material, as a result of which there is an opportunity of recycling functional material, facilitating particularly favorable recovery.

Moreover an element, in particular a heat insulation element, for example for a heat insulation compound system, a façade insulation or a roof insulation, is proposed, which is produced from a functional material according to the invention and/or in a method according to the invention. An "element" is herein in particular to mean a structural element and/or construction element which is intended to be sold, like for example a panel.

DRAWING

Further advantages will become apparent from the following description of the drawing. The drawing shows an exemplary embodiment of the invention. The drawing, the description and the claims contain a plurality of features in combination. Someone skilled in the art will purposefully also consider the features separately and will find further expedient combinations.

DESCRIPTION OF THE EXEMPLARY EMBODIMENT

The single FIG. 1 schematically shows an element 10, in particular with heat insulating characteristics, made of a functional material. The functional material is produced on the basis of thermoset plastic materials, like in particular PUR or PIR. The element 10 is at least substantially made of the functional material. The element 10 may, for example, comprise a core that is made of the functional material and is coated on one side or on both sides. It is however also conceivable that the element 10 is entirely implemented of the functional material.

The functional material has, as its first component, the thermoset plastic material. The thermoset plastic material may, for example, be a comminuted rigid foam. As a second component, the functional material comprises a binding material for binding the thermoset plastic material. For a production of the element 10, a material implemented at least partly of the thermoset plastic material, like for example PUR/PIR rigid foam from production residue, from restructuring, from vehicle superstructures and other superstructures, from further processing as well as the functional material itself, is mechanically comminuted, mixed with the binding material and shaped. It is possible to further process the elements which are produced from the functional material and are intended for the element 10, depending on their respective shape and/or dimensions, subsequently to completed curing and cooling of the functional material. In the cured state, the functional material is, for example, capable of being cut or milled.

The comminuted thermoset plastic material is mixed with the binding material. In its non-cured state, the binding material has a liquid or pasty consistence but may just as well be flour-like or granular. The binding material binds the thermoset plastic material. In its cured state, the functional material is dimensionally stable. Mass fractions of the thermoset plastic material, the binding material in particular depend on a structure of the mixture and of the type and mixing of the binding material. The thermoset plastic material and the binding material typically have a weight ratio of at least 5:1 relative to one another, i.e. regarding their mass fractions the functional material contains at least five times as much thermoset plastic material than binding material.

The functional material has a thermal conductivity, according to EN 12667 [European Standard 12667], of maximally 0.10 W/(m·K), preferably more than 0.07 W/(m·K). The functional material further has a bulk density that is greater than 450 kg/m$^3$ and a compressive stress according to DIN EN 826 [German/European norm 826] that is greater than 6 MPa. The functional material is preferably putrefaction-resistant and rotproof. Moreover the functional material is preferably resistant against mineral oils, solving agents as well as deluted bases and acids. The functional material further has a flexural strength according to DIN EN 12089 [German/European norm 12089] that is greater than 4 MPa, a shearing resistance according to DIN EN 12090 [German/European norm 12090] that is greater than 1 MPa and a transverse strength according to DIN EN 12090 [German/European norm 12090] that is greater than 1 MPa. Furthermore the functional material preferably has a screw holding strength according to DIN EN 14358 [German/European norm 14358] of at least 7.5 N/mm$^2$ for a surface extraction of a 6×60 wood screw.

An initial composition of the functional material consisting of nothing but, as a first component, the thermoset plastic material and, as a second component, the binding material has a burning behavior corresponding to a fire reaction class E according to DIN EN 13501-1 [German/European norm 13501-1] and to a building material class B2 according to DIN 4102-1 [German norm 4102-1]. For the purpose of improving the burning behavior, an additive is added, as a third component, to the initial composition consisting of the thermoset plastic material and the binding material. The additive comprised in the functional material is configured to improve the burning behavior. Due to the additive, the functional material has a burning behavior corresponding at least to fire reaction class C according to DIN EN 13501-1 [German/European norm 13501-1] and at least to building material class B1 according to DIN 4102-1 [German norm 4102-1].

The additive is mixed with the thermoset plastic material and the binding material. In a method for producing the functional material the additive is added to the thermoset plastic material and the binding material before the binding material is cured. The additive is preferably embodied as a solid matter, which may be added to the thermoset plastic material and/or the binding material as a powder or as a granular material. The comminuted thermoset plastic material has a consistence that is at least similar to a consistence of the additive. The comminuted thermoset plastic material has a maximum particle size that is maximally 5 mm but is preferably smaller. Due to its particle size the additive is easily mixable with the comminuted thermoset plastic material.

In a production of the functional material the thermoset plastic material is comminuted, for example by grinding. The comminuted thermoset plastic material, which is preferably implemented as a flour, is mixed with the additive. The thermoset plastic material and the additive in particular realize a homogeneous mixture. When the thermoset plastic material has been mixed with the additive, the binding material is added. In addition, a fiber material may be added to the mixture as a fourth component, which is mixed with the thermoset plastic material, the binding material and/or the additive. To solidify the mixture of the comminuted thermoset plastic material, the binding material and the additive, pressure and temperature are applied to the mixture in a mold. If the binding material is floury or granular, it will be liquefied as a result. The binding material, which is liquid or pasty at least under temperature impact, binds the thermoset plastic material and the additive and is cured when the mixture cools off.

The additive has a mass fraction of at least 3%. In particular, the additive has a mass fraction between 5% and 20%, the mass fraction being in particular 10%±3%. Thus the thermoset plastic material and the binding material together have a mass fraction of typically 80%±3%. The binding material typically has a mass fraction of maximally 20%. The thermoset plastic material thus typically has a mass fraction between 60% and 75%. The thermoset plastic material has a bulk density which is smaller by many times than a bulk density of the binding material.

In case of a temperature impact, the additive features an intumescence behavior by which a bulk density of the additive changes when a temperature of the functional material exceeds an activation temperature of the additive. In an initial state, the additive has a bulk density that is in particular smaller than 5 g/cm$^3$. The bulk density is typically between 1 g/cm$^3$ and 3 g/cm$^3$. The additive has an expansion rate of at least 30 cm$^3$/g. Preferably the expansion rate is greater than 100 cm$^3$/g and may be typically in a range between 250 cm$^3$/g and 400 cm$^3$/g. The intumescence behavior thus results in a volume increase of the additive by a factor of at least 10 if the functional material is heated to a temperature which is greater than the activation temperature of the additive. Principally it is however also conceivable that the additive has a different expansion rate.

The additive has an activation temperature of at least 90° C. Preferably the activation temperature is above 120° C. When the functional material with the additive is heated to the activation temperature of the additive, the additive expands. The volume fraction of the additive changes if a temperature of the functional material exceeds the activation temperature of the additive.

The additive has a carbon content that is preferentially at least 85% but may principally be smaller than that. The additive is structured on the basis of a graphite. The additive is embodied as an expandable graphite. The additive comprises molecules of an acid which are embedded between layers of the graphite. If the additive is heated above the activation temperature, the layers expand and the volume increases.

The invention claimed is:

1. A functional material, comprising:
   a first component, which is a thermoset plastic material;
   a second component, which is a binding material for binding the thermoset plastic material, the binding material having a liquid consistency in a non-cured state; and
   a third component, which is at least one additive configured to improve a burning behavior, the burning behavior corresponding to at least to a fire reaction class C as given by DIN EN 13501-1 [German/European norm 13501-1],
   wherein the functional material has a thermal conductivity, according to EN 12667 [European Standard 126671], of maximally 0.10 W/(mK) and a bulk density that is greater than 450 kg/m$^3$.

2. The functional material according to claim 1, wherein the thermoset plastic material comprises comminuted polyurethane (PUR) rigid foam according to DIN EN 13165 [German/European norm 13165] and/or polyisocyanurate (PIR) rigid foam and/or comminuted phenolic rigid foam, which are/is bound by the binding material.

3. The functional material according to claim 1, further comprising
   a fiber material, which is mixed with the thermoset plastic material and/or the binding material and/or the additive.

4. The functional material according to claim 1, wherein the burning behavior corresponds at least to a fire reaction class C according to DIN EN 13501-1 [German/European norm 13501-1] and/or corresponding at least to a building material class B1 according to DIN 4102-1 [German norm 4102-1].

5. The functional material according to claim 1, wherein the additive is mixed with the thermoset plastic material and/or the binding material.

6. The functional material according to claim 1, wherein the at least one additive has a mass fraction of at least 3% of a total mass percentage of the functional material.

7. The functional material according to claim 1, wherein in case of a temperature impact, the additive presents an intumescent behavior.

8. The functional material according to claim 7, wherein the additive has an activation temperature above which the additive expands, and
   an expansion rate of the additive above the activation temperature is at least 30 cm$^3$/g.

9. The functional material according to claim 1, wherein the additive has an activation temperature of at least 90° C. above which the additive expands.

10. The functional material according to claim 1, wherein the additive has a carbon content.

11. The functional material according to claim 1, wherein the additive is an expandable graphite.

12. A method for producing a functional material having a thermal conductivity, according to EN 12667 [European Standard 12667], of maximally 0.10 W/(mK) and a bulk density that is greater than 450 kg/m$^3$, from a thermoset plastic material, which is, in a comminuted state, mixed with at least one binding material, which in its non-cured state has a liquid consistency, wherein at least one additive is added which improves a burning behavior prior to an impact of temperature and/or pressure onto the thermoset plastic material and the binding material, wherein the burning behavior corresponds at least to a fire reaction class C according to DIN EN 13501-1 [German/European norm EN 13501-1].

13. The method according to claim 12, wherein
    the additive is added before and/or after and/or simultaneously with introducing the binding material.

14. The method according to claim 12, wherein
    the thermoset plastic material comprises comminuted functional material.

15. A heat insulation element, which is produced from a functional material according to claim 1.

16. A heat insulation element, which is produced in a method according to claim 12.

17. The method according to claim 12, wherein the thermoset plastic material is based on polyurethane (PUR) rigid foam according to DIN EN 13165 [German/European norm 13165] and/or polyisocyanurate (PIR) rigid foam.

* * * * *